Feb. 2, 1971  G. ROUYER ET AL  3,559,438
METHOD OF PLANING THIN METALLIC STRIPS AND
CORRESPONDING PLANING DEVICE
Filed July 29, 1968  7 Sheets-Sheet 1

INVENTORS
GEORGES ROUYER
GASTON FONTAINE
BY KARL W FLOCKS
ATTORNEY

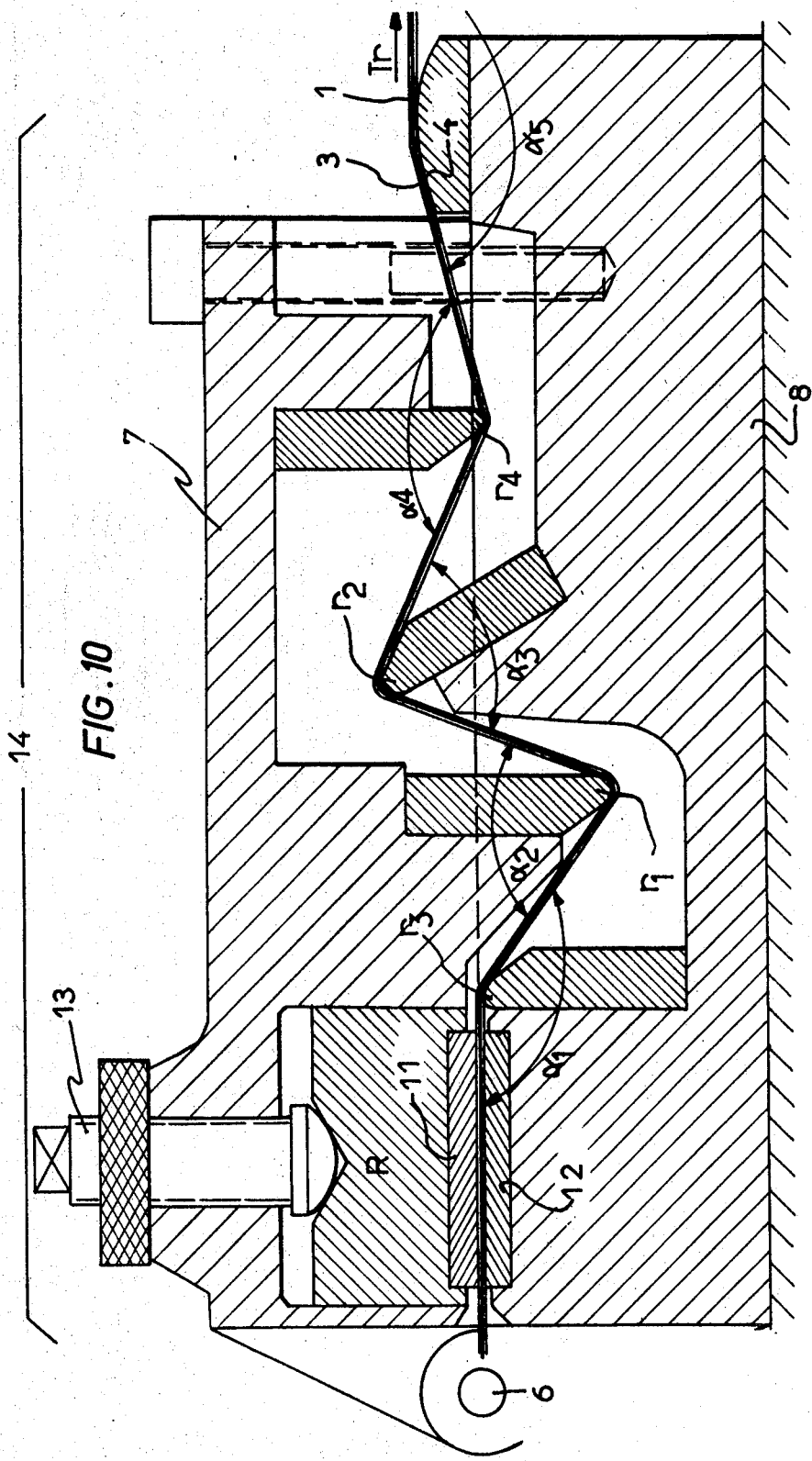

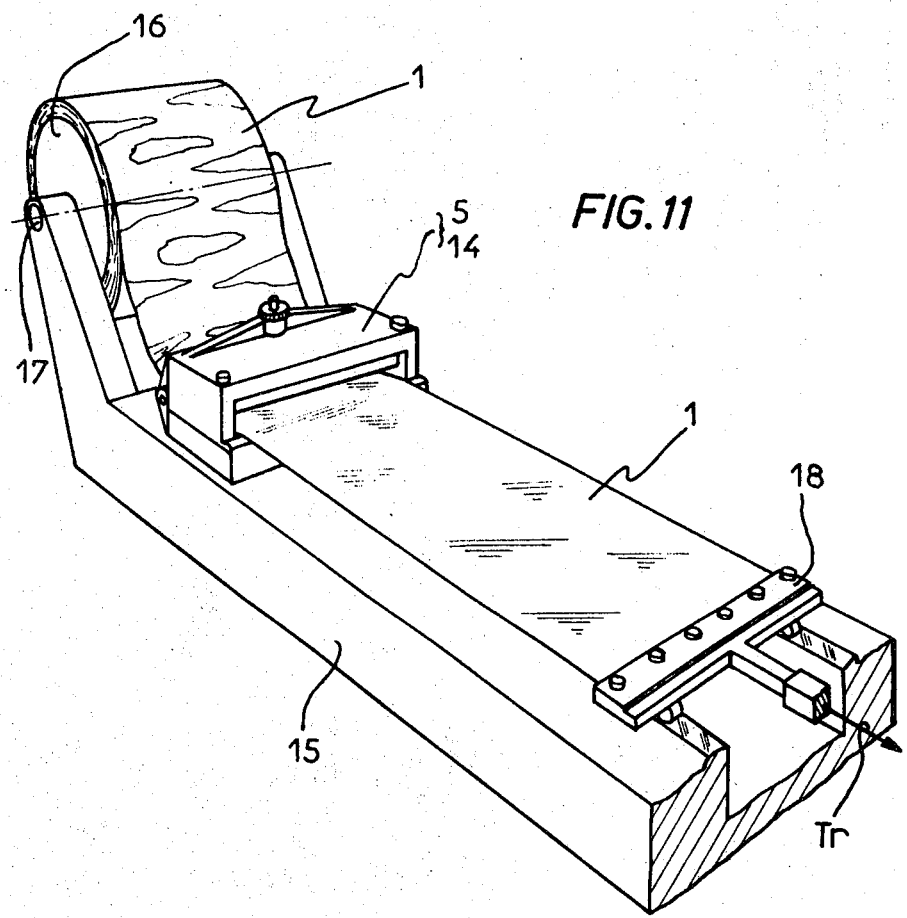
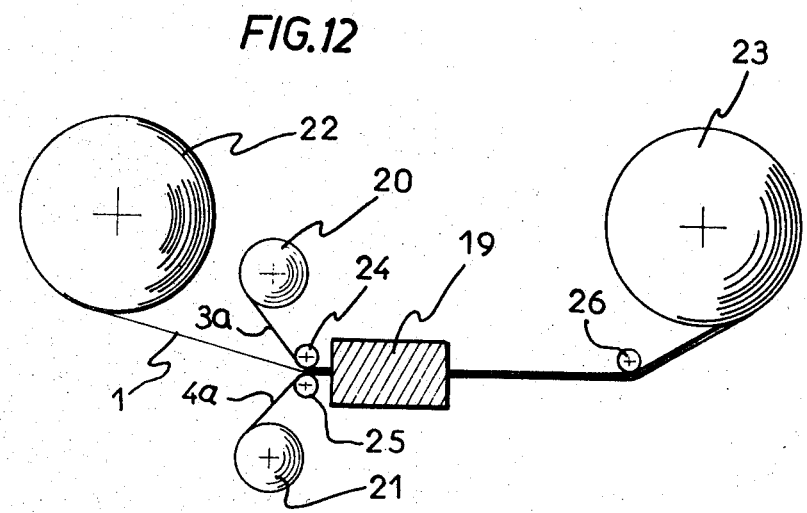

United States Patent Office 3,559,438
Patented Feb. 2, 1971

3,559,438
METHOD OF PLANING THIN METALLIC STRIPS AND CORRESPONDING PLANING DEVICE
Georges Rouyer, Paris, and Gaston Fontaine, Chatenay-Malabry, France, assignors to Nord-Aviation Société Nationale de Constructions Aéronautiques, Paris, France, a joint-stock company of France
Filed July 29, 1968, Ser. No. 748,392
Claims priority, application France, July 31, 1967, 116,384
Int. Cl. B21d 1/06
U.S. Cl. 72—160                                    4 Claims

ABSTRACT OF THE DISCLOSURE

Method and machine for planing thin metallic strips having more or less large blisters included in adjoining strained zones, characterized in that lateral strains, with a tendency to the widening of the strip, are produced by the angular passage of the strip under longitudinal stress, over at least one radiated edge of a planing tool, in order to obtain a resorption of the blisters by recompression of the latter with overstepping of the elastic limit.

---

It is generally known in industry that metallic strips frequently possess defects in flatness properties characterized by unequally blistered zones.

In order to overcome this, one can obtain truly flat strips in different ways;

By hand by a specialized workman but the work is too slow;

By lengthening on a traction bench, but this method is only applicable to materials the texture of which is very homogeneous;

By rolling on multiple roller machines which give satisfactory results on heterogeneous materials, but the thickness of such materials must remain equal to or higher than 1 mm.

The planing of thin strips without limiting fineness and the texture of which may not be homogeneous, thus remains a difficult operation which, to the knowledge of applicant, has not yet received any satisfactory solution.

Generally speaking, all the defects in thin metallic strips which arise from complex rolling phenomena and from the heterogeneity of the metal and which are essentially of two orders, according as to whether the blisters are small surfaces or large areas, all proceed from the same known phenomenon, that is to say that any weakened zone D or blister is always included in an adjoining strained zone T (FIG. 1).

The problem of planing these strips therefore always consists in distributing and stabilizing the internal stresses in such a way that the stressing of the weakened zones and/or the weakening of the strained zones, brings about the rebalancing sought after. Now, and although the planing principle thus exposed appears simple to realize, applicant has been led to observe that the application of known methods was totally inoperative for certain metals, such as stainless steels or niobium or molybdenum for example.

These setbacks seem to arise from the fact that the conventional methods, which all operate more or less through lengthening of the strip, cannot allow the uniform overstepping of the elastic limit necessary for the satisfactory distribution of the strains, this being particularly evident for all more or less heterogeneous metals, strongly hammer-hardened and with high elastic limits.

The planing method according to the invention is essentially characterized in that each blister is, according to its size, either locally resorbed by pure lateral compression obtained during the passage under stress of the strip on a radiated edge of a planing tool, or balanced by weakening of the periphery obtained by stretching of the adjoining strained parts, it being possible for the two operations to co-exist in the carrying out of the method.

The phenomenon of resorption of the weakened part of each blister may be explained in the following manner:

When one disposes a blistered part on a radiated edge and that one subjects said blister, by a suitable means, to uniform radial pressures operating in the direction of the convexity one may observe, by assimilating the blister to an embedded plate uniformly loaded and by considering that the portion of the blister situated on the generating line of the edge may be assimilated to an element uniformly loaded and embedded in two supports (Timoshenko "Théorie des plaques et des coques" page 59), that the bending moments taken in the plane of the generating line of the edge are negative adjacent to the supports, which may bring about very substantial lateral forces of pure compression which may give rise, under given conditions and by local overstepping of the elasticity limit under compression, to local recompressions of the weakened parts of the blisters. Of course, if the conditions necessary for the appearance of bending moments of an intensity to produce the direct resorption are not assembled (in the case of fairly large blisters for example), the same phenomenon may produce, in a first stage, a separation of the large blisters into a multitude of smaller blisters by local buckling which will resorb by themselves when the said resorption conditions are assembled.

However, and for all large sized blisters which can be neither resorbed or separated, a mere weakening of the strained parts adjacent to the blisters is then sufficient to produce the sought for planing effect.

The present invention also relates to a machine for carrying out the method explained above. According to two embodiments of said machine a strip is, either planed directly between planing tools, or planed between two protection sheets.

Other characteristics and advantages of the invention will be apparent from the following description, referring to the accompanying drawings in which:

FIG. 10 shows, in an arrangement identical to the one of FIG. 9, the passage of the strip between two protection sheets.

FIG. 11 shows, according to a perspective view, a planing machine corresponding to the invention equipped with the planing block of FIG. 9.

FIG. 12 is a diagram showing a planing arrangement in which the protection sheets are continuously advanced and remain integral with the strip.

Figure 2:
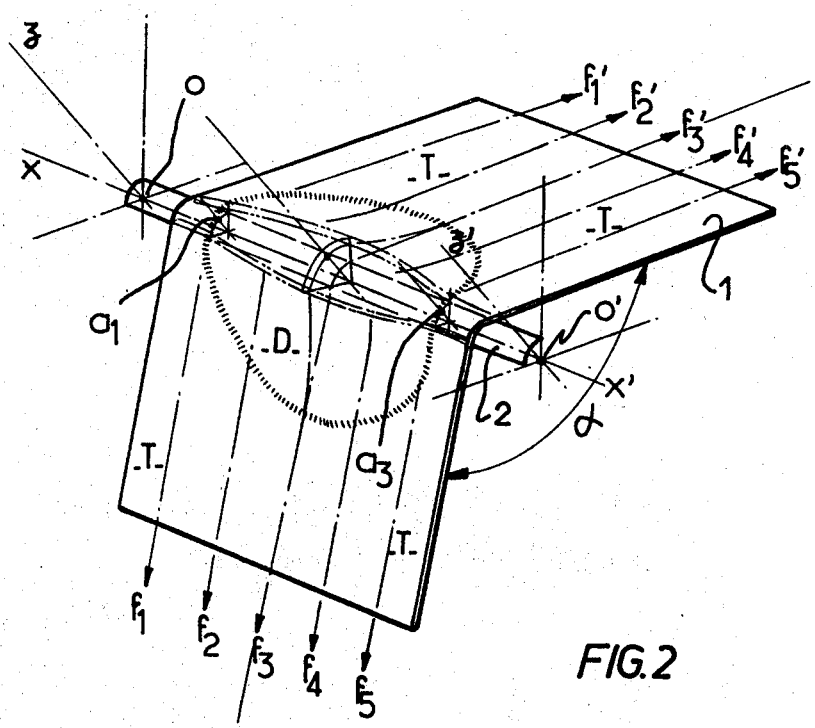
FIG. 2 is a diagram showing, according to a perspective view, the detail of the method corresponding to the invention according to which the blistered strip is applied under stress against a radiated edge.
Figure 3:
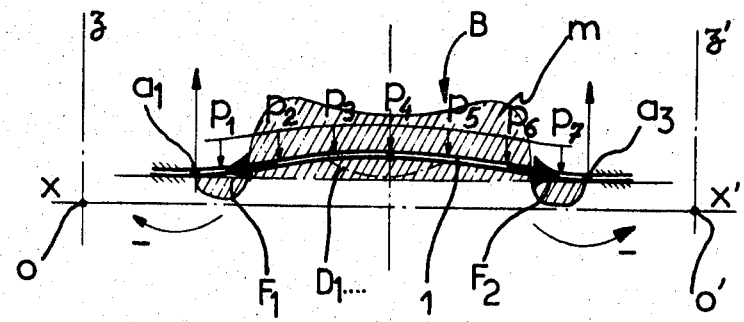
FIG. 3 is a diagram showing, according to a partial section, the position of the blister on the radiated edge as well as the diagram of the bending moments.

If one refers to FIG. 2 which shows diagrammatically the blistered part D of a strip 1 disposed against a radiated edge 2 which is rectilineal along $x$, $x'$, one will observe that the application of the forces $f_1 \ldots f_5$ and $f_1' \ldots f_5'$ on said strip, will create unequal longitudinal stresses according to the portion of the blister under consideration. On the other hand, by examining FIG. 3 which shows a cross section along $z$, $o-z'$, $o'$ of FIG. 2, one may consider that the friction of the strip 1 against the radiated edge 2 will produce, on the paths of the forces $f_1 \ldots f_5$, $f_1' \ldots f_5'$ at $a_1$ and $a_3$, real embeddings such that the part of the blister in question may be considered as a uniformly loaded element between $a_1$ and $a_3$ under the combined action of the forces $f_1 \ldots f_5$ and $f_1' \ldots f_5'$ carrying with them pressure forces $p_1 \ldots p_7$.

In a similar manner, the blister D which is compressed by the same forces $p_1 \ldots p_7$, will produce a negative bending moment $m$ near the embeddings $a_1$, $a_3$, and lateral strains $F_1$, $F_2$ will be created to urge said blister to recompress on itself. If the pressure parameters have been suitably chosen as a function of the characteristics of the strip, these lateral forces $F_1$ and $F_2$ must be such that the elastic limit under compression of the material is then exceeded in the blister itself, bringing about, consecutively, the disappearance of the latter with a tendency to the widening of the strip. However, if the forces $F_1$ and $F_2$ are insufficient to produce a direct recompression of the initial blister with overstepping of the elastic limit under compression, they may be sufficient to produce a separation of said initial blister into several reduced secondary blisters, in such a way that the latter may then compress themselves, in a second stage.

Figure 4:
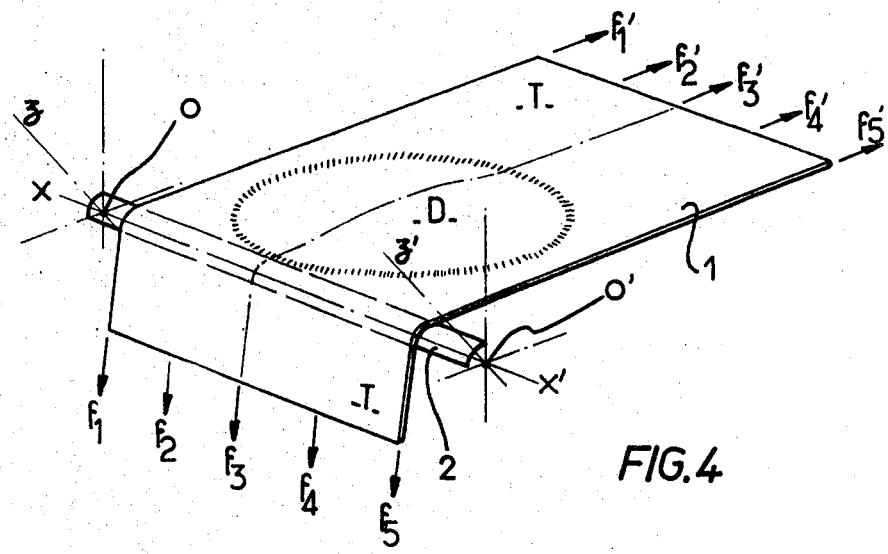
FIG. 4 is a diagram showing, according to a perspective view, the detail of the method according to the invention in which the beginning of the blister is just arriving on the radiated edge.
Figure 5:
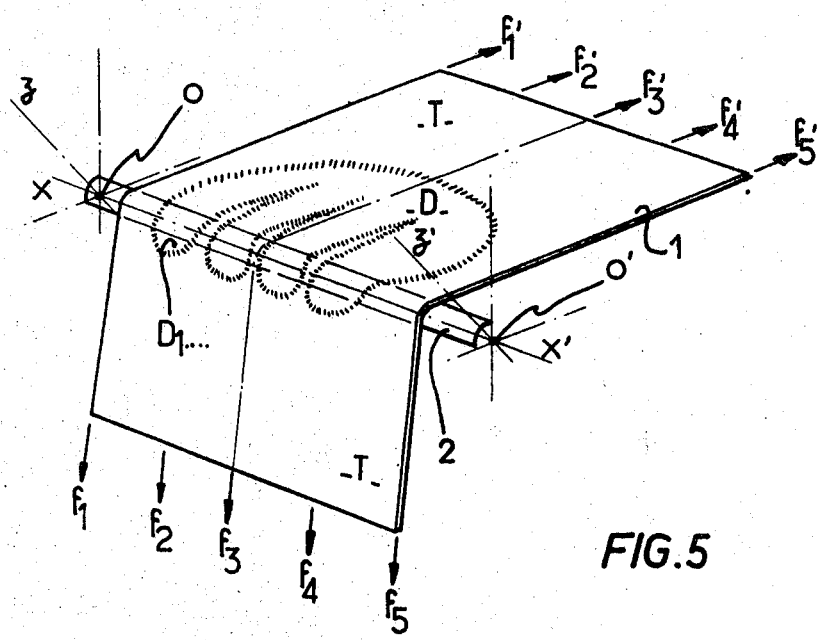
FIG. 5 is a diagram showing, according to a perspective view, the detail of the method according to the invention in which a relatively large blister begins to subdivide itself into smaller blisters after engaging on a radiated edge.

FIGS. 4 and 5 show, to this end, how the strip possessing the blister D may, by passing under stress on the radiated edge 2, be planed, either by direct recompression as indicated above, or by divisions $D_1 \ldots$ of the main blisters capable of being themselves resorbed in a subsequent operation.

Jointly with this operation, it will obviously be observed that if the blister is very large, which does not permit the appearance of the sufficient recompression forces $F_1$ and $F_2$, the stresses $f_1 \ldots f_5$ will, on their part, be sufficient to produce a lengthening of the strained parts T such that the latter may, by overstepping the elastic limit under traction, strain the weakened parts D of the blisters.

Figure 6:
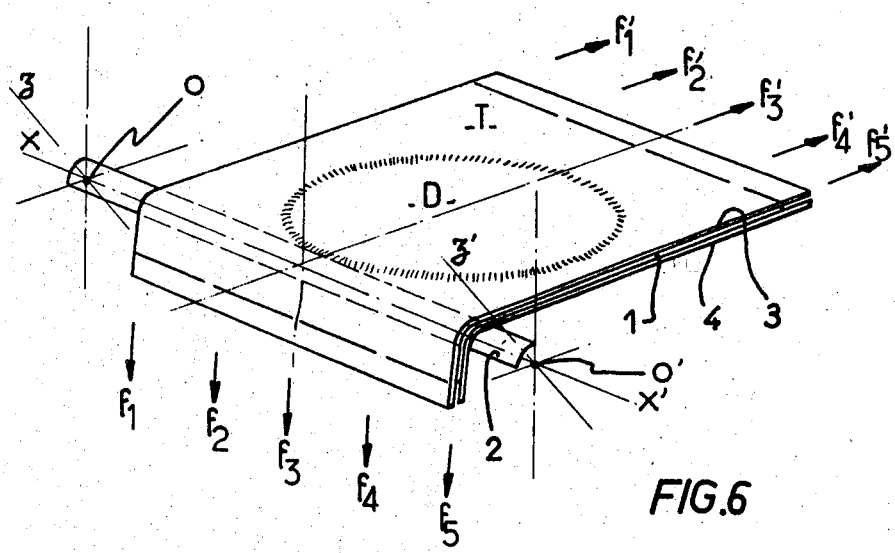
FIG. 6 is a diagram showing, according to a perspective view, the detail of the method according to which the beginning of the blister arrives on the radiated edge between two protection sheets.
Figure 7:
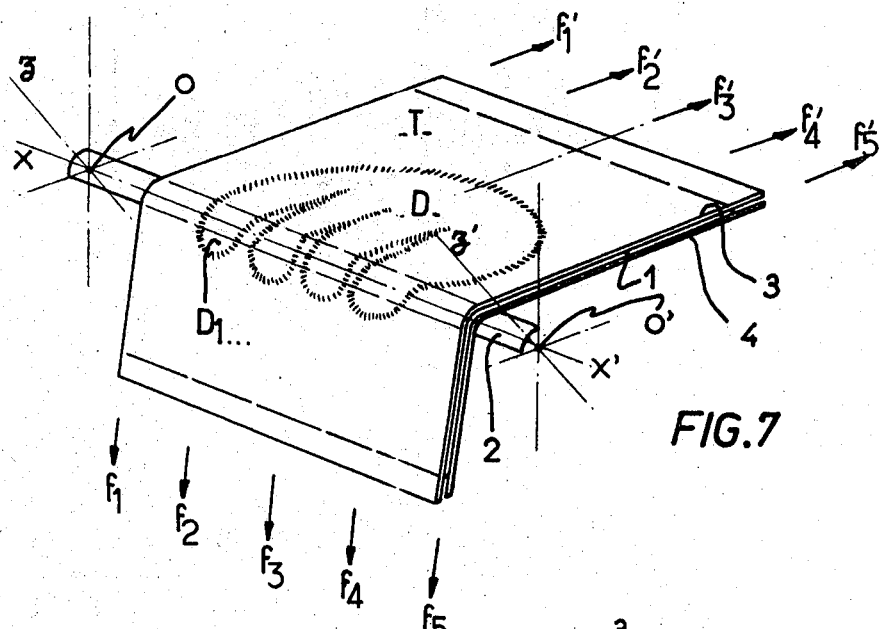
FIG. 7 is a diagram showing, according to a perspective view, the detail of the method according to which the blister is subdivided between two protection sheets.
Figure 8:
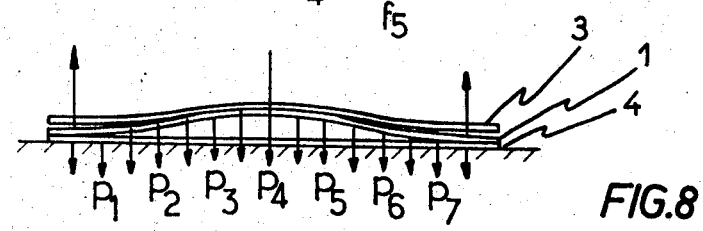
FIG. 8 is a view in partial section showing the position of the blister between its protection sheets.

In a method of procedure which is completely similar and which implies the presence of two protection sheets 3, 4 such as is shown in FIGS. 6, 7 and 8, it will be seen that the pressure forces $p_1 \ldots p_7$ will, as a matter of fact, be created in the same manner by said sheets since, as is shown in FIG. 8, said pressures will indeed produce the bending moment, as previously.

Of course, all the parameters defining the conditions of resorption of the blisters or of weakening of the strained parts must be foreseen in consideration of the importance of the blisters, of the nature of the metal and of the thickness of the strip, all this determining, consecutively, the forces to be applied to the ends of the strip.

Figure 9:
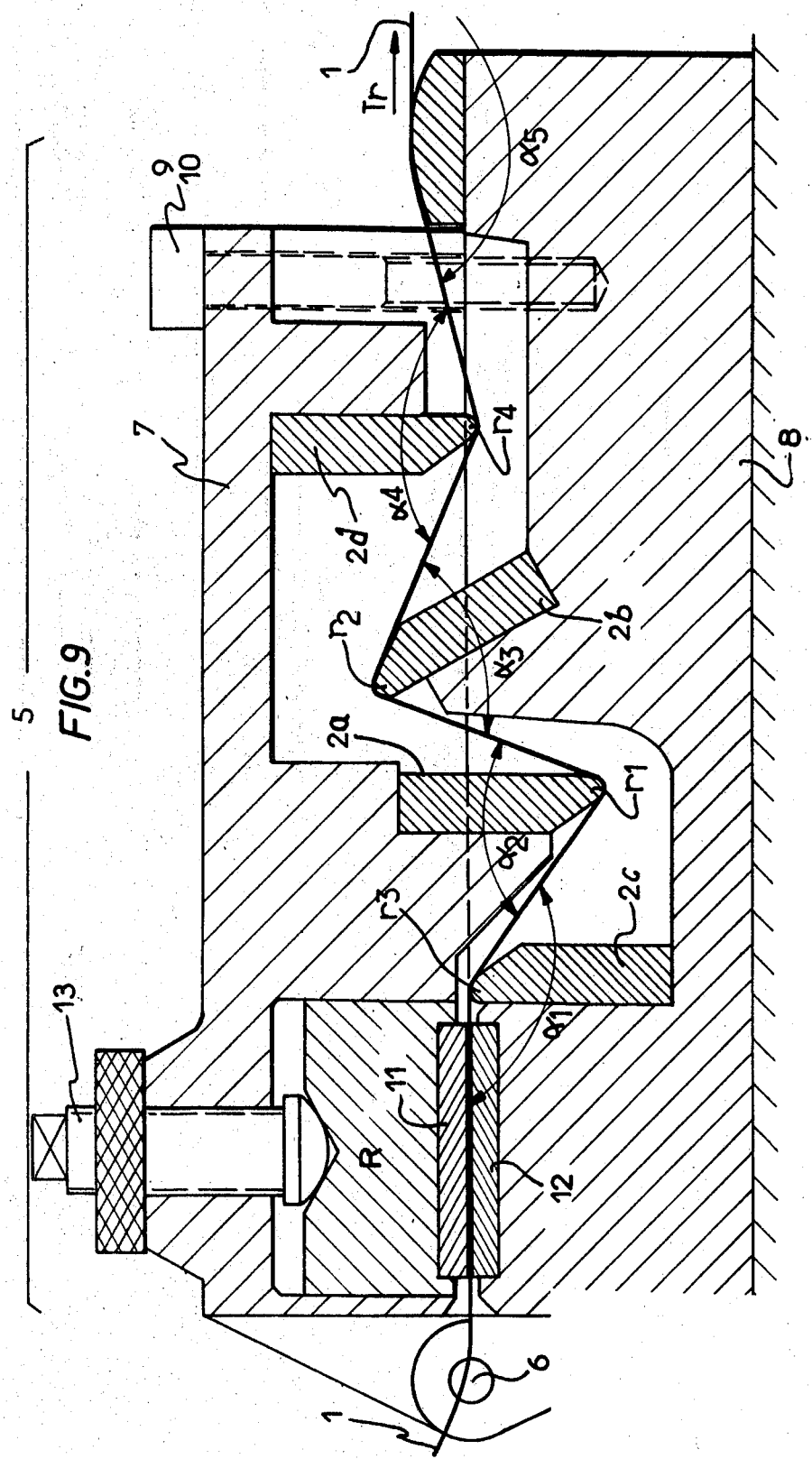
FIG. 9 shows, in longitudinal section, a planing block for the application of the method according to the invention, in which the naked strip advances under stress between stationary planing tools in staggered arrangement.

According to an embodiment of a machine for carrying out the method according to the invention, a planing block (FIG. 9), indicated as a whole by 5, comprises two stationary planing tools with radiated edges 2a and 2b disposed inversely and two supporting tools 2c and 2d to permit suitable angular positioning of the strip as well as to cancel the winding effect of the last tool 2b. This block pivots along an axis 6 so as to open completely in two parts 7 and 8 for the insertion of the strip and it is locked in the working position by two screws 9 and 10.

Furthermore, a holding device R comprising two friction shoes 11 and 12 and a shoe clamping screw 13 permits of ensuring the suitable tension of the strip.

In such a planing block and by way of example a strip of stainless steel strongly hammer-hardened of a thickness of 0.1 mm. and a width of 500 mm. comprising blisters of all sizes having a sag of several millimetres, is completely planed if the angles have been chosen equal to: $\alpha_1=145°$, $\alpha_2=75°$, $\alpha_3=90°$ and $\alpha_4=140°$ and if the radii are around $r_1=r_2=3$ mm. and $r_3=r_4=5$ mm., the tools being on the other hand of hard polished steel.

It is obvious that such a planing block must, in all cases, be inserted along a line of advance of the strip so as to ensure, by means of a traction device Tr, the suitable tension of said strip.

According to another embodiment of the machine according to the invention shown in FIG. 10, a similar planing block, indicated as a whole by 14, may carry out a complete planing when the strip 1 is inserted between two protection sheets 3, 4. Thus and by way of example, a strip of niobium of a thickness of 0.1 mm. and a width of 500 mm. is completely planed between two sheets of stainless steel of a thickness of 0.1 mm. In such a case, clamping forces of the shoes 11 and 12 controlled by the screw 13 are slightly different, the other parameters concerning the angles $\alpha$ and the radii $r$ remaining unchanged relative to the preceding planing block.

In an assembly which gives very satisfactory results for relatively short strips of a few meters, the planing machine shown in FIG. 11 may advantageously make use of the planing block 5 (FIG. 9) or 14 (FIG. 10). This unit comprises essentially, apart from the planing block, a frame 15, a supply roller 16 for the strip to be planed rotating on a shaft 17 and a gripping device 18 driven by a conventional traction device (not shown) permits the passage under tension of the strip.

FIG. 12 shows an assembly in which the planing operation takes place in a planing block 19 and the operation is carried out between two plastic sheets 3a and 4a, adhesive for example, which are fed continuously by two reels 20 and 21. In this assembly, the strip to be planed is itself fed by a supply reel 22 and it is received on a traction reel 23. Three rollers 24, 25 and 26 ensure, moreover the guiding of the strips.

Figure 1:
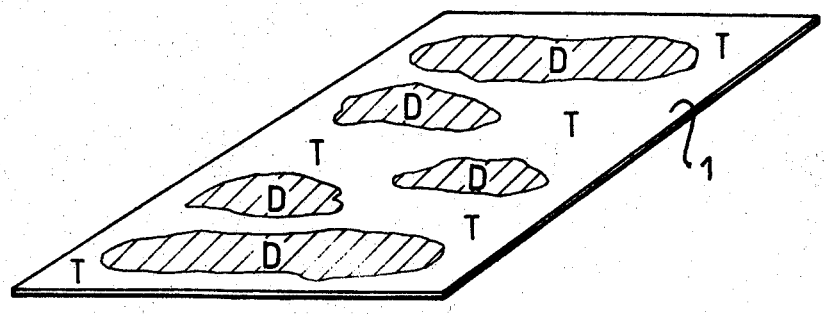
FIG. 1 is a diagram showing, according to a partial perspective view, an uneven strip having blistered zones, thus weakened, and strained zones.
Figure 13:
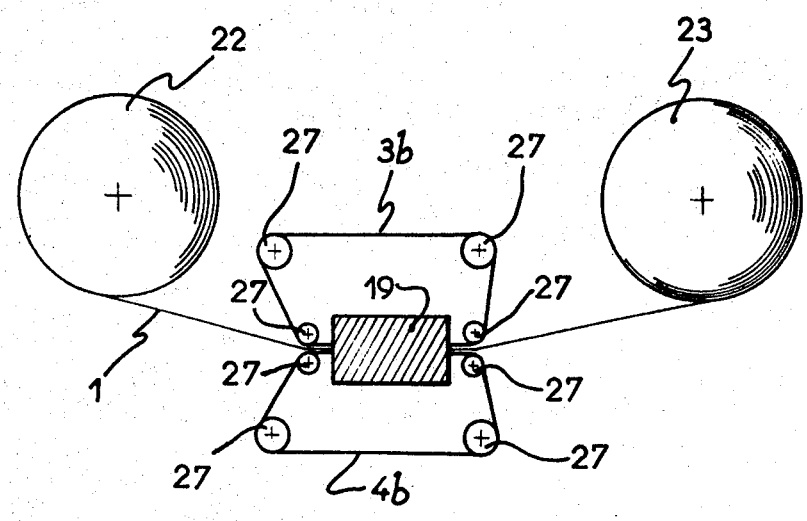
FIG. 13 is a diagram showing a planing arrangement in which the protection sheets do not remain integral with the strip.

According to a variant of this assembly which is shown in FIG. 13, the protection sheets 3b and 4b may not remain integral with the strip but serve as a simple protecting or lubricating device according to their nature for the surface of the strip during the planing operation. Thus, this last assembly may comprise, apart from the usual supply and traction reels, a system of endless feed of the sheets obtained by means of the driving rollers 27.

It is obvious that these embodiments have been given purely by way of example and in no limited sense and that all the devices carying out the method according to the invention would remain within the scope of the latter. It is thus, in particular, that the planing tools may be of any number and of any combinations, stationary or rotary, that the strip to be planed may be of any bi- or multi-metal nature, that the protection sheets may be of any nature and finally that the passage operation of the strip for the application of the method may be realized in any manner whatsoever.

We claim:

1. Machine for planing thin strip metal having more or less large blisters included in adjoining strain zones comprising in combination with means for pulling the strip:
- a hinged axis,
- two main hollowed parts hinged on said axis which are closely adjacent when in operative position,
- at least two staggered stationary planing tools of unequal operative height acting successively upon the strip, one of said tools being provided within one of said main hollowed parts and the other tool within the other main hollowed part, the working edge of each of said tools being uniformly rounded along its length,
- means to direct the strip to the first of said tools at an angle to its direction of pull,
- means to direct the strip out to the last of said tools at an angle to its direction of pull,
- a rear strip holding tool,
- a front smooth edged block to eliminate the tendency of the strip to curl,
- whereby lateral strains in the strip with recompression of the blisters and above the elastic limit of the metal fibers in compression are produced.

2. Machine according to claim 1 wherein the unequality of operative height of said planing tools with respect to the general direction of pull of the strip is obtained by inclining differently to said direction of pull at least one of said tools.

3. Machine according to claim 1 wherein the said rear strip holding tool comprises
- two friction shoes,
- and a device for clamping said shoes.

4. Machine according to claim 1 wherein a device is provided for locking the said two main hollowed parts when they are in their closed adjacent operative position.

References Cited

UNITED STATES PATENTS

| | | | |
|---|---|---|---|
| 2,183,969 | 12/1939 | McKinney | 72—161 |
| 2,275,095 | 3/1942 | Thaden | 72—160 |
| 2,395,651 | 2/1946 | Anderson | 72—161 |
| 2,602,538 | 7/1952 | Bimba et al. | 72—42 |
| 2,851,080 | 9/1958 | Anderson | 71—161 |
| 2,854,056 | 9/1958 | Stanius | 72—160 |
| 3,374,653 | 3/1968 | Zeigler | 72—161 |

RICHARD J. HERBST, Primary Examiner